Nov. 28, 1972  J. O. FREY ET AL  3,704,232

PREPARATION OF SULFIDE PHOSPHORS

Filed Sept. 24, 1970  2 Sheets-Sheet 1

INVENTORS.
JAMES O. FREY,
HARRY L. MARSHALL,&
HENRY B. MINNIER

BY Donald R. Castle
ATTORNEY

United States Patent Office  3,704,232
Patented Nov. 28, 1972

3,704,232
PREPARATION OF SULFIDE PHOSPHORS
James O. Frey and Harry L. Marshall, Towanda, and Henry B. Minnier, Dushore, Pa., assignors to GTE Sylvania Incorporated
Filed Sept. 24, 1970, Ser. No. 74,966
Int. Cl. C09k 1/12
U.S. Cl. 252—301.6 S         3 Claims

ABSTRACT OF THE DISCLOSURE

An improved process for producing phosphor compositions having a multivalent metal sulfide host and a source of activator material comprising at least one metal having a tripositive valence which comprises adding at least about 0.5% barium chloride flux material and heating the mixture in an atmosphere of carbon disulfide and an inert gas carrier at a volumetric ratio of carbon disulfide to inert gas of at least about 1:50.

CROSS-REFERENCE TO RELATED APPLICATION

Co-pending U.S. patent application Ser. No. 8,041 filed Feb. 2, 1970 discloses the phosphor compositions and a process for producing them. This application is an improvement which further improves the physical characteristics of the phosphor compositions. The foregoing co-pending application is assigned to the same assignee as the present application and is incorporated by reference herein.

BACKGROUND OF THE INVENTION

Field of the invention

This invention relates to an improved process for preparing phosphor compositions. More particularly, it relates to an improved process for preparing phosphor compositions having a multivalent sulfide as the host material and co-activated by at least one metal having a tripositive valence.

Prior art

In the preparation of sulfide phosphors, heretofore, a mixture of the sulfide host material and the appropriate activator have been heated in either an inert gas atmosphere or in a hydrogen sulfide atmosphere. While this process has been satisfactory to produce phosphors for many uses, it generally didn't produce brighter green and blue cathodoluminescent phosphor compositions with the short decay times desired for use in color television.

Trivalent positive metal ions, when incorporated into the matrix of the host along with other metal ions as activators, tend to improve the luminescent properties of the phosphor compositions. The problem heretofore that has confronted those skilled in the art has been the lack of a suitable process for incorporating these tripositive metal ions into the matrix of the host. This problem was essentially overcome in the aforementioned co-pending U.S. patent application Ser. No. 8,041 which is incorporated by reference herein. This process produced improved blue and green cathodoluminescent phosphor compositions having higher brightness, lighter body color and a more favorable bake-shift than the previously prepared sulfide phosphor. The improvement recited herein improves the physical characteristics of the phosphor compositions thus enabling the phosphor to be used more efficiently.

Fluxing agents, namely alkali and alkaline-earth halides, are normally used with silver-activated sulfides to help eliminate aggregation and agglomeration problems. They generally do not work with copper-activated sulfides because of the sensitivity of copper to the chloride ion when the chloride ion is in the host lattice. Normally, a material with a long decay time is produced when these halide fluxing agents are used with copper activated phosphors.

It is believed, therefore, that a process for producing phosphors having a multivalent metal sulfide host and activated with a multimetal activator material which uses a barium chloride as a flux material, and produces a brighter, less agglomerated and less aggregated crystalline phosphor material with shortened decay times would be an advancement in the art.

SUMMARY OF THE INVENTION

In accordance with one aspect of this invention, there is provided an improvement in the process for producing a phosphor having a multivalent metal sulfide host and a multimetal activator containing at least one tripositive metal ion. The improvement comprises adding at least about 0.5% barium chloride as a reflux material to the homogeneous mixture and heating the mixture in an atmosphere of carbon disulfide and an inert gas carrier having a volumetric ratio of at least about 1:50.

Figure 1:
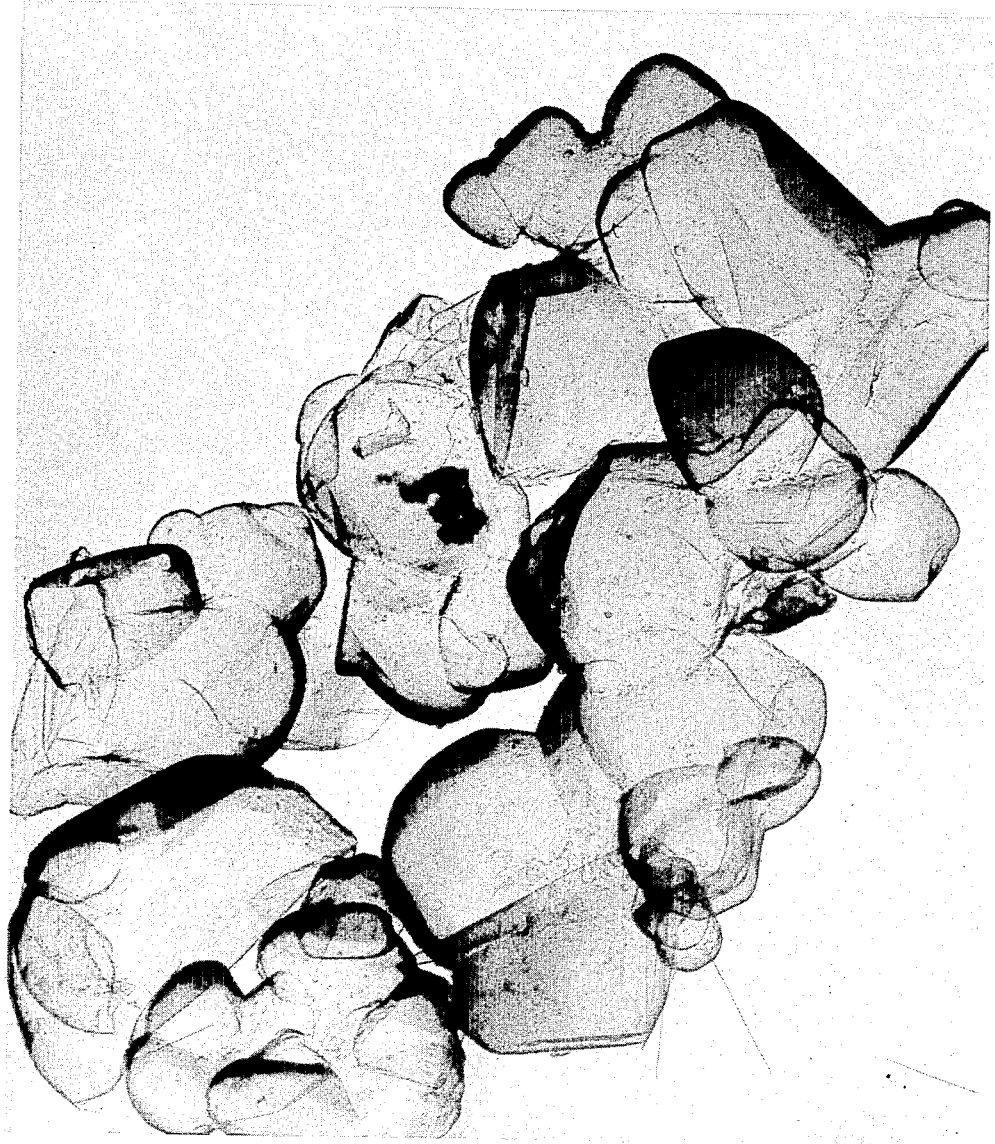
FIG. 1 is a photomicrograph of phosphor material produced by the method disclosed in U.S. Ser. No. 8,041.

Each of these is a 12,500 magnification of the material.

DESCRIPTION OF THE PREFERRED EMBODIMENTS

For a better understanding of the present invention, together with other and further objects, advantages, and capabilities thereof, reference is made to the following disclosure and appended claims in connection with the above-described drawings.

The process of this invention is useful in manufacturing phosphor compositions having a multivalent metal sulfide host and a multimetal activator material, one of the metals being a metal ion that has a tripositive valence. It is particularly useful in manufacturing phosphor compositions of this type that are unagglomerated, unaggregated, crystalline and that have acceptable decay time.

Surprisingly, it has been found that when $BaCl_2$ is added to the homogeneous mixture of the metal sulfide host material and activators and the resultant mixture is then heated at a temperature range of from about 900° C. to about 1250° C. for at least about 30 minutes in an atmosphere of gas comprising carbon disulfide and an inert gas having a volumetric ratio of at least about 1:50, a crystalline phosphor material that is unagglomerated and unaggregated and has a shortened decay time is produced. These results are obtained when about 0.5% to about 5%, by weight of the sulfide host, barium chloride is used. Especially preferred is 0.5% to about 2% barium chloride. When less than about 0.5% barium chloride is used, no fluxing action takes place and an agglomerated phosphor results. When more than about 5% barium chloride is used, the barium is difficult to remove and can result in large fused particles.

The mixture is heated in an atmosphere of carbon disulfide and an inert gas such as nitrogen, argon, and the like. The inert gases will generally be used to carry the carbon disulfide. The preferred carrier gas is nitrogen. The volumetric ratio of carbon disulfide to the inert gas carrier is at least about 1:50 and can be as high as about 1:85, although ratios of from about 1:50 to 1:65 are preferred. A carbon disulfide to inert gas ratio greater than about 1:85 results in an increase in decay time and a carbon disulfide to inert gas ratio below about 1:50 can result in some residual carbon being formed in the phosphor composition.

It is generally preferred that the pressure of the carbon disulfide-carrier atmosphere is a slight excess of atmosphere pressure to insure that air does not leak into the system, that is, above at least about 1 inch of water above atmospheric pressure. Although other methods of control of the ratio of carbon disulfide to the inert gas carrier can be achieved by a number of methods that will occur to one skilled in the art, one method of control that is satisfactory is to allow the inert gas to flow through carbon disulfide that is held at a constant temperature. Total flow, that is inert gas plus carbon disulfide, can be regulated by the flow of the ratio of inert gas to the carbon disulfide. The ratio of carbon disulfide and inert gas carrier can be regulated by the temperatures of the carbon disulfide and of the inert gas.

Figure 2:
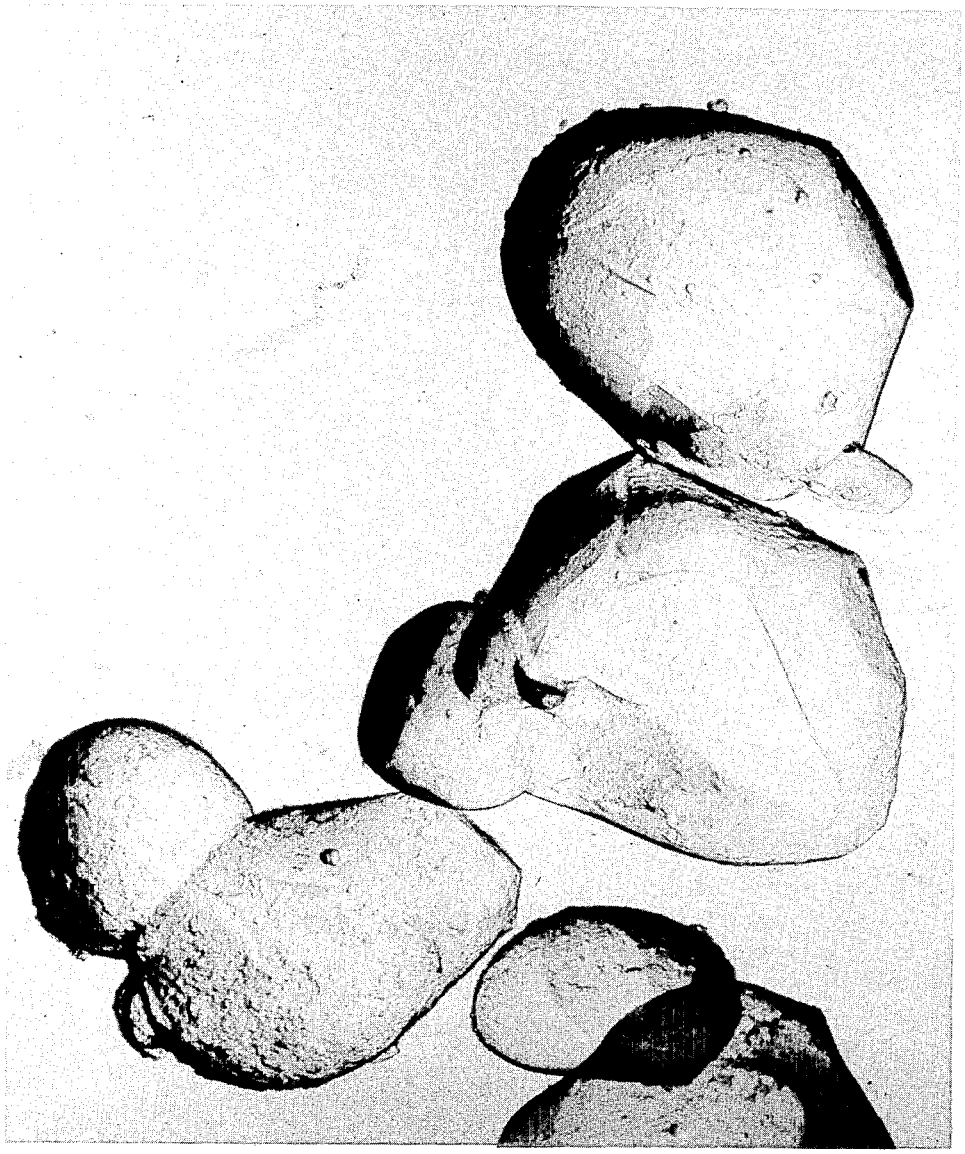
FIG. 2 is a photomicrograph of phosphor material produced by this invention.

As previously mentioned, the process of this invention can be used to produce phosphor compositions having a multivalent metal sulfide host and activated with a multimetal activator material containing at least one metal ion having a tripositive valence. The process is especially useful in producing phosphor compositions having a zinc cadmium sulfide host and activated with aluminum and another metal such as silver, copper, or gold, which are about 5% brighter than similar phosphor compositions produced by the prior art and are crystalline unagglomerated and unaggregated. FIG. 1 is a photomicrograph of phosphor material produced by the process disclosed in Ser. No. 8,041 which was superior to similar material produced by prior art methods. FIG. 2 is a photomicrograph of phosphor material produced by this invention, and illustrates an unagglomerated and unaggregated phosphor material which can be readily screened and used by color television tube manufacturers. Each of these is a 12,500 magnification of the material.

In order to more fully illustrate the preferred embodiments of this invention, the following detailed examples are given. All parts, proportions, and percentages are by weight unless otherwise given.

EXAMPLE I

Two samples of blue or green-emitting phosphor compositions are prepared by slurrying in an aqueous media the following constituents:

TABLE I

| Phosphor A: | Phosphor B: |
|---|---|
| 92.3 parts ZnS | 92.0 parts ZnS |
| 7.7 parts CdS | 8.0 parts CdS |
| 0.0005 part Cu as $CuSO_4$ | 0.0005 part Cu as $CuSO_4$ |
| 0.0010 part Al as $AlCl_3 \cdot 6H_2O$ | 0.001 part Al as $AlCl_3 \cdot 2H_2O$ |
|  | 1.0 parts $BaCl_2$ |
| 45:1 ratio of flow rates of $N_2:CS_2$ | 55:1 ratio of flow rates of $N_2:CS_2$ |

The solids are removed from the water by filtration and are subsequently dried by warm (120° C.) air. The phosphors are prepared by placing the solids in a furnace having a flow of carbon disulfide and nitrogen at the ratios given in Table I. The temperature of the material is raised to about 1100° C. and held for about one hour.

The material is removed from the furnace and evaluation tests are run on samples of the resulting phosphors for brightness, chromaticity, and decay time under cathode ray excitation. Photomicrographs are taken on the same samples for aggregation and agglomeration characteristics.

TABLE II

|  | Phosphor A | Phosphor B |
|---|---|---|
| Brightness, percent | 100 | 105 |
| Chromaticity coordinate $x$ | .325 | .328 |
| Chromaticity coordinate $y$ | .590 | .593 |
| Decay time |  | (¹) |

¹ Equal to Phosphor A.

The fluxed phosphor (Phosphor B in FIG. 2) appears much more crystalline and is less agglomerated and aggregated than the unfluxed phosphor (Phosphor A in FIG. 1).

While there have been shown and described what are at present considered the preferred embodiments of the invention, it will be obvious to those skilled in the art that various changes and modifications may be made therein without departing from the scope of the invention as defined by the appended claims.

What is claimed is:

1. In the process for preparing sulfide phosphors wherein a relatively homogeneous mixture of a multivalent metal sulfide host and a source of activator material comprising at least one metal having a tripositive valence is heated at a temperature of from about 900° C. to about 1250° C. for at least about 30 minutes in an atmosphere of carbon disulfide and an inert gas carrier, the improvement which comprises:
   (a) adding from about 0.5% to about 5% by weight of barium chloride to said homogeneous mixture, and
   (b) heating said mixture in an atmosphere of carbon disulfide and an inert gas carrier, the volumetric ratio of carbon disulfide to said inert gas being from about 1:50 to about 1:85 respectively.

2. A process according to claim 1, wherein said barium chloride is present in amount of from about 0.5% to about 2% by weight of said sulfide host.

3. A process according to claim 1, wherein said volumetric ratio of said carbon disulfide to said inert gas is from about 1:50 to about 1:65.

References Cited

UNITED STATES PATENTS

| 2,623,858 | 12/1952 | Kroger | 252—301.6 S |
| 2,623,859 | 12/1952 | Kroger et al. | 252—301.6 S |
| 2,126,233 | 8/1938 | Wakenhut | 252—301.6 S |

JAMES E. POER, Primary Examiner

J. COOPER, Assistant Examiner

U.S. Cl. X.R.

252—301.4 S